March 17, 1925.
K. S. BAKER
COMPUTATION TABLE AND APPARATUS FOR USING SAME
Filed May 1, 1922
1,529,827
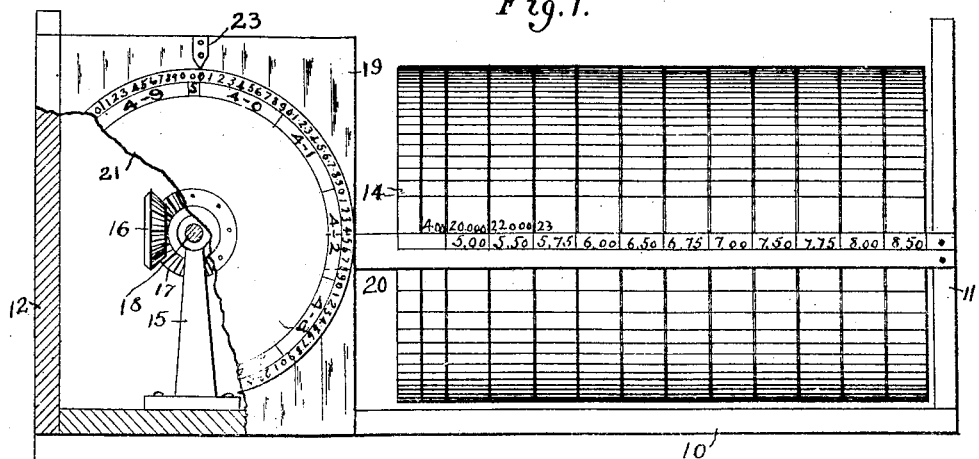
Fig. 1.
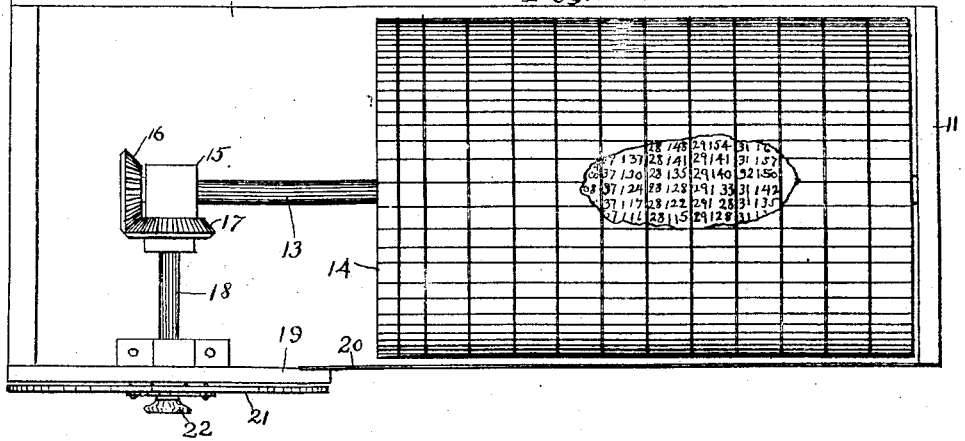
Fig. 2.
Fig. 3.
Inventor:
Kirby S. Baker.

Patented Mar. 17, 1925.

1,529,827

UNITED STATES PATENT OFFICE.

KIRBY SIMONS BAKER, OF LEWISTON, MAINE.

COMPUTATION TABLE AND APPARATUS FOR USING SAME.

Application filed May 1, 1922. Serial No. 557,690.

*To all whom it may concern:*

Be it known that I, KIRBY S. BAKER, a citizen of the United States, residing at Lewiston, in the county of Androscoggin and State of Maine, have invented certain new and useful Improvements in Computation Tables and Apparatus for Using Same, of which the following is a specification.

My invention relates to time keeper's tables and the object of the invention is to devise a table for reckoning pay which will cover a great range of multiplications of resultant quantities on a relatively small space.

I have illustrated in the accompanying drawing my table and also a mechanical device by which I make use of the table in practice.

Referring to the drawing:—

Fig. 1 is a front elevation of the time keeping device,

Fig. 2 is a plan of the same and,

Fig. 3 is a sufficient portion of the table showing the arrangement of the columns of figures so that the principle on which it is made up may be clearly disclosed.

Referring to the table, which may be printed on a sheet of any desirable size, 1 represents a column which I term the standard time column, preferably arranged along the left hand side of the sheet. It is composed of a hundred members running as here shown from 400 to 500 for the purpose of including between 40 and 50 the number of hours that will include a week's time in an average business establishment.

It is evident that these numbers may extend from 500 to 600 or indeed any successive numbers may be used as long as the tens and units are used for both the daily and weekly time.

Thus, the lowest number 400 indicates just 40 hours weekly time and zero hours daily time. 401 will indicate 40.1 hours weekly time and 0.1 hours daily time. 425 will indicate 42.5 hours weekly time and 2.5 hours daily time and so on.

Thus, by the two right hand figures as the units and tens of both quantities the cents in the resultant multiplicand will be the same after the time is multiplied by the rate.

Arranged at right angles to column 1 is column 2 or the standard rate column in which are arranged successively figures indicating rates per hour and extending as here shown from 20 cents upward to $1.00 In addition to these two columns, I extend downward from the standard rate column a series of rate columns carrying resultant quantities and extending horizontally over from the numbers in the standard time column are intersecting time columns extending entirely across the sheet.

The intersection of the time columns and the rate columns give the resultant pay for the daily pay of ten hours or less and the weekly pay containing the same number of cents in each. In the table as I construct it, the figures indicating cents are distinguished from the figures indicating dollars by contrasting colors but in the present instance, as here shown, I have drawn a line 9 between the group indicating the pay for hours less than ten and the group indicating dollars of weekly pay.

For instance, the pay for 9.1 hours as found at 3 in column 1 at the rate of 25 cents as shown at 4 will amount to $2.28 as shown at 5, reading the three figures on the right of the column, the cents group being 228 and the dollars group being 12 and the two groups being separated by the vertical line 9.

The pay for 49.1 hours which would be the weekly pay is found at the same point and amounts to $12.28 disregarding the figure 2, the center figure of the quantity lying between the dollar group and cents group.

Again, .7 of an hour as indicated at 6 at the rate of 20 cents an hour as indicates at 7 gives 14 cents.

40.7 hours indicated also at 6 gives the resultant pay shown at 7 of $8.14, disregarding the 0 which lies between the 8 and the 14 and which separates the group of cents from the group of dollars.

In this manner, the weekly and the daily pay is read off from the table using the same time number and the same resultant or pay number for both by reading the dollars and cents for the daily pay less than 10 hours from the right hand side of the quantity and the dollars and cents of weekly pay by reading first the dollars and then the same number of cents as before, the cents being the same in both cases.

Referring to Figs. 1 and 2 of the drawing, upon the base 10 are upright ends 11 and 12. A drum 14 is secured to a shaft 13, the shaft being journalled to the upright end 11 and in a standard 15 secured to the base. Mitre gears 16 and 17 connect the shaft 13 with a counter shaft 18 journalled in a face plate 19 secured to the base 10.

On the outer surface of the drum 14 my table is applied by securing a printed form or printing the same directly on the drum with the standard time column 1 and the several rate columns extending laterally around the drum and with the several rates marked or impressed on the upper edge of the bar 20, one end of which is secured to the upright end 11 and the other to the face plate 19.

The upper edge of the bar 20 extends along the front of the drum 14 at above the center point and the various figures of rate register with the rate columns of the drum or table.

Secured to the outer end of the shaft 18 is a disk 21 operated by a knob or handle 22 so that the disk and the shaft 18 can be freely turned by the knob 22.

The disk 21 being of the same diameter as the drum turns with exactly the same motion and assumes positions exactly corresponding with the positions of the drum. The pointer 23 on the face plate 19 and the parts are so located and adjusted that the point 23 on the edge of the disk corresponding with any of the time columns on the drum or table will being the necessary time column adjacent to the upper edge of the bar 20 where it can be be easily read.

The disk 21 is marked off to correspond exactly with the standard time column, that is to say, it is divided into 100 equal portions around its circumference with an inner circle divided into ten parts.

The figures on the inner circle run from 40 to 50 and the numbers on the outer edge of the disk indicate the tenths of hours.

Thus, the disk being set as shown in the drawing with the point 23 on zero indicates that the drum is turned with the lower column of figures just above the indicating line of the bar 20. The device thus is set for 40 hours for the weekly time and zero for the daily time.

As the disk is turned to the left, the reading line on the edge of the bar 20 will ascend the table and indicate greater and greater time, both the weekly and the daily time, the reading on the cylinder being just the same as explained on the table.

At whatever point the disk is turned with respect to the indicator 23 the payments for the time indicated, both daily and weekly time are read off from the drum immediately above the upper line of the bar 20.

It is evident that the device may be incased in any suitable manner so as to be protected and that the rotating disk and rotating drum may be connected by any suitable connecting mechanism so that the rotation of the drum and the disk will correspond and synchronize.

I claim:—

1. A time keeper's table having a standard time column of a series of numbers of three figures, arranged progressively, the first two figures representing hours per week and the next two figures representing hours per day, a standard rate column at right angles to said standard time column having progressive rate numbers of hourly rates, rate columns extending from each hourly rate parallel with said standard time column and time columns extending from the numbers in said standard time column parallel with said standard rate column, the pay for any given time up to 10 hours being found in the intersection of the time column and the rate column reading the right hand group of pay figures and the weekly pay indicated by the same time figures being read at the same point reading the left hand group of figures, the right hand group and the left hand group of figures being separated to be easily distinguished.

2. A time keeper's table having a standard time column of one hundred numbers of three figures arranged progressively from any even number of hundreds to the next higher even hundred as from 400 to 500, the first two figures representing hours per week and the next two figures representing hours per day, a standard rate column at right angles to said standard time column having progressive rate numbers of hourly rates, rate columns extending from each hourly rate parallel with said standard time column and time columns extending from the numbers in said standard time column parallel with said standard rate column, the pay for any given time up to 10 hours being found in the intersection of the time column and the rate column, reading the right hand group of figures, the weekly pay being read at the same point reading the left hand group of figures, the right hand group and the left hand group of figures being separated to be easily distinguished.

3. A time keeper's table having a standard time column of a series of numbers of three figures arranged progressively, the first two figures representing hours per week and the next two figures representing hours per day, a standard rate column at right angles to said standard time column having progressive rate numbers of hourly rates, rate columns extending from each hourly rate parallel with said standard time column and time columns extending from the numbers in said standard time column parallel with said standard rate column, the pay for any given time up to 10 hours being found in the intersection of the time column and the rate column reading the right hand group of figures and the weekly pay indicated by the same time figures being read at the same point reading the left hand group of figures.

4. A time keeper's table having a standard time column of one hundred numbers of three figures arranged progressively from any even number of hundreds to the next higher even hundred as from 400 to 500, the first two figures representing hours per week and the next two figures representing hours per day, a standard rate column at right angles to said standard time column having progressive rate numbers of hourly rates, rate columns extending from each hourly rate parallel with said standard time column and time columns extending from the number in said standard time column parallel with said standard rate column, the pay for any given time up to 10 hours being found in the intersection of the time column and the rate column reading at right hand group of figures and the weekly pay being read at the same point reading the left hand group of figures for dollars and the same number of cents.

KIRBY SIMONS BAKER.